United States Patent
O'Neil et al.

(10) Patent No.: US 9,603,208 B2
(45) Date of Patent: Mar. 21, 2017

(54) LED DRIVER WITH AUXILIARY POWER OUTPUT

(71) Applicant: EPTronics, Inc., Gardena, CA (US)

(72) Inventors: Tom O'Neil, Torrance, CA (US); Lee Chiang, Sylmar, CA (US)

(73) Assignee: EPTronics, Inc., Gardena, CA (US)

( * ) Notice: Subject to any disclaimer, the term of this patent is extended or adjusted under 35 U.S.C. 154(b) by 0 days.

(21) Appl. No.: 14/803,007

(22) Filed: Jul. 17, 2015

(65) Prior Publication Data

US 2017/0019964 A1    Jan. 19, 2017

(51) Int. Cl.
| | | |
|---|---|---|
| H05B 41/18 | (2006.01) | |
| H05B 33/08 | (2006.01) | |
| H05B 37/02 | (2006.01) | |

(52) U.S. Cl.
CPC ..... H05B 33/0815 (2013.01); H05B 33/0809 (2013.01); H05B 33/0839 (2013.01); H05B 33/0851 (2013.01); H05B 37/02 (2013.01)

(58) Field of Classification Search
CPC .... H05B 33/08; H05B 37/02; H05B 33/0809; H05B 33/0815; H05B 33/0839; H05B 33/0851
USPC .................................. 315/276, 294; 363/21
See application file for complete search history.

(56) References Cited

U.S. PATENT DOCUMENTS

| | | | | | |
|---|---|---|---|---|---|
| 4,041,355 | A | * | 8/1977 | Onodera | H01F 38/42 315/399 |
| 5,754,415 | A | * | 5/1998 | Blackmon | H02M 3/33561 363/21.16 |
| 6,577,510 | B1 | * | 6/2003 | Yasumura | H02M 3/3385 363/21.02 |
| 6,972,696 | B2 | * | 12/2005 | Rogers | G01C 23/00 340/971 |
| 2009/0184654 | A1 | * | 7/2009 | Fukumoto | H02M 3/335 315/276 |
| 2012/0262961 | A1 | * | 10/2012 | Chien | H02M 3/33507 363/84 |

OTHER PUBLICATIONS

AN-9750 High Power Factor Flyback Converter for LED Driver with FL7732 PSR Controller.

* cited by examiner

*Primary Examiner* — Tung X Le
(74) *Attorney, Agent, or Firm* — Clement Cheng

(57) ABSTRACT

An LED driver has a primary side regulation with at least one input connected to the AC power line, and at least two outputs. At least one output is for driving LEDs and at least one output is for providing auxiliary power for associated circuits. The driver is constructed using the flyback principle, having at least one flyback transformer which has at least one primary winding connected to a flyback switching transistor. At least one principal output winding is connected to the LED load, and at least one feedback winding is connected to a control chip. At least one auxiliary winding drives the auxiliary power output. The auxiliary winding has a coupling coefficient to said feedback winding which is greater than the coupling coefficient between the principal output winding and the feedback winding.

14 Claims, 4 Drawing Sheets

LED DRIVER WITH AUXILIARY POWER OUTPUT

TECHNICAL FIELD

The present invention is in the field of primary side regulated LED drivers having an auxiliary power output.

BACKGROUND OF THE INVENTION

Flyback converters for driving LED arrays from the AC power line are well known in the art. See for example, Fairchild Semiconductor publication application note AN-9750, entitled High-Power Factor Flyback Converter for LED Driver with FL7732 PSR Controller, the disclosure of which is incorporated herein by reference, which shows a flyback controller. One of the features which is conventional in a flyback transformer design is to have close coupling between the primary winding and the secondary or output winding. This is because if there is flux leakage, as illustrated in FIG. 1, then when the primary switch is opened, energy stored in the leakage flux field must be dissipated somehow, usually as heat in a snubber arrangement. The extent to which this happens decreases the efficiency of the converter and is undesirable. There are various ways to achieve close coupling and low flux leakage, one of the most common being to interleave the primary and secondary windings in what is known as a sandwich arrangement. FIG. 2 shows a conventional flyback transformer cross section in which primary and secondary windings are alternated in order to minimize flux leakage. This illustrates how transformer designers have techniques at their disposal which allow them to make the coupling between transformer windings tighter or looser.

In a transformer which has say, windings 1 and 2, the inductance of winding 1 with winding 2 open circuit is called the primary inductance. Measuring the same inductance with winding 2 shorted measures the leakage inductance which is associated with flux through winding 1 which does not couple with winding 2. The primary inductance we shall call Lp, and the corresponding secondary inductance Ls. The coupling between the primary inductance and the secondary inductance is characterized by a mutual inductance Mps. If there was no flux leakage then Mps relates to Lp and Ls by the equation:

$$Mps = \sqrt{(Lp \cdot Ls)}$$

In real life there is always some flux leakage, and so the observed Mps is less, so that Mps=k√(Lp·Ls) where k is a coupling coefficient ranging from zero to unity.

Transformer engineers can control the value of k using the physical design of the transformer. In a classic flyback converter, the value of k representing the coupling between primary and secondary is always kept extremely close to unity in order to maximize the efficiency.

Since most flyback transformers are controlled by an integrated circuit chip, it is conventional to have a third winding present which is used to generate power to operate the control chip. In some flyback designs which use so called "primary side regulation" (PSR) the voltage from this winding is also used as a source of feedback to the control chip to indicate variously the voltage, current or power of the secondary side winding. Such an arrangement is shown in FIG. 3. Here the primary winding is labelled N1 (341), the secondary winding is labelled N3 (343) and the third feedback winding is labelled N2 (342). Diodes 331 and 332 divide the signal from the feedback winding N2 for the purposes of chip Vcc power and signal feedback respectively. In this arrangement the coupling coefficient K13 between winding N1 and winding N3 is close to unity, and the coupling coefficient K32 between winding N3 and winding N2 is close to unity.

The feedback signal is very important for the flyback control chip (not shown) since it represents the power from the output and is used by the control chip to compute the power factor correction process which ensures that the current drawn from the power line is sinusoidal and in phase with the power line voltage. This means that the power factor can be high (close to unity) and the harmonic distortion (THD) of the input current will be low. For most commercial purposes THD of less than 20% is required and less than 10% is considered excellent.

Also shown in FIG. 3 is a fourth winding N4 (344). The ac voltage from this winding is rectified by diode 333 and then smoothed on capacitor 334 so that it can be used as an auxiliary output source. Such a source may be used, for example, to provide power for a fan, sensors, a wireless control system, or to operate analog or PWM dimming circuitry. Such a power source is a standard ingredient for contemporary LED lighting systems, and the power drawn from it may be relatively large and variable. However, since the winding N4 is typically wound on the outside of a transformer with relatively loose coupling to the other windings, then when increasing amounts of power are drawn from it, this event is not fully reflected in the feedback signal sent back to the control chip from winding N2. The coupling coefficient K42 (coupling coefficient between windings 4 and 2) is usually relatively low. (It is difficult to simultaneously have high coupling coefficients between multiple windings at the same time, so a process of compromise is necessary.) This means that the power factor and THD of the input current will become degraded when substantial power is drawn from the auxiliary power output since the control chip is not receiving a signal which properly reflects the power being drawn from that output.

From the foregoing it is apparent that there is a need for an LED drive circuit which can provide an auxiliary power supply source, responsive to varying loads, for the use of associated circuitry, without degrading the power factor and THD of the driver and while maintaining constant drive to the main LED load.

REFERENCES CITED

US Patent Documents

U.S. Pat. No. 6,707,283 March 2004 Ball
U.S. Pat. No. 8,008,898 August 2011 Melanson
U.S. Pat. No. 8,198,874 June 2012 Melanson
U.S. Pat. No. 8,212,493 July 2012 Melanson
U.S. Pat. No. 8,222,872 October 2012 Melanson
Ser. No. 08/576,589 November 2013 Melanson
2014/0246992 September 2014 Chanduplata
20150137707 May 2015 Seo
U.S. Pat. No. 7,817,447 October 2010 Huynh
U.S. Pat. No. 8,059,429 November 2011 Huynh
U.S. Pat. No. 8,143,845 March 2012 Choi
U.S. Pat. No. 8,885,364 November 2014 Wang
20140140109 May 2014 Valley

Foreign Patent Documents

CN103840673A
CN203482447U

SUMMARY OF THE INVENTION

The present invention relates to power supplies for driving LEDs, and more particularly to primary side regulated switch mode power supplies configured to provide a substantial and varying auxiliary power supply for use by associated apparatus simultaneously with a regular output to an LED load.

A PSR flyback power supply for driving LEDs has a transformer with four windings; (1) for the primary power connected to the main flyback switch; (2) a feedback winding to supply VCC power for a control chip and to feedback to the control chip the loading conditions on the output (secondary) side of the transformer; (3) for the main secondary output power to drive the LED load; and (4) an auxiliary output winding to supply external power to associated circuitry. The coupling coefficient between auxiliary output winding 4 and feedback winding 2 is made to be higher than the coupling coefficient between feedback winding 2 and main secondary output power winding 3, although both coupling coefficients may be high.

This means that the control chip will be responsive to the loading of the auxiliary power winding, maintaining good THD and power factor as this loading varies. A consequence of this is that when the auxiliary power winding is loaded and its output voltage declines slightly, the control chip will order up more power to minimize the drop in output voltage. At the same time, the main output power winding 2 will receive more power and its voltage will rise slightly. The consequences of this are mitigated by placing the auxiliary power winding in series with the main output power winding so that the rise in voltage across the main output power winding will be compensated by the drop in voltage across the auxiliary power winding which is in series with it. Since it is conventional in these kinds of products to finally drive the LEDs from (for example) a constant current buck converter which draws its power from the main output power winding, then the current supplied to the LEDs remains constant even though the power being delivered by the auxiliary power winding may be varying considerably. The power factor and THD of the input current will remain within an acceptable range, for example THD less than 20% and power factor greater than 0.90.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views, with the first digit being changed to correspond to the figure number. The drawings are not necessarily to scale, emphasis instead being placed upon illustrating the principles disclosed herein.

Figure 1:
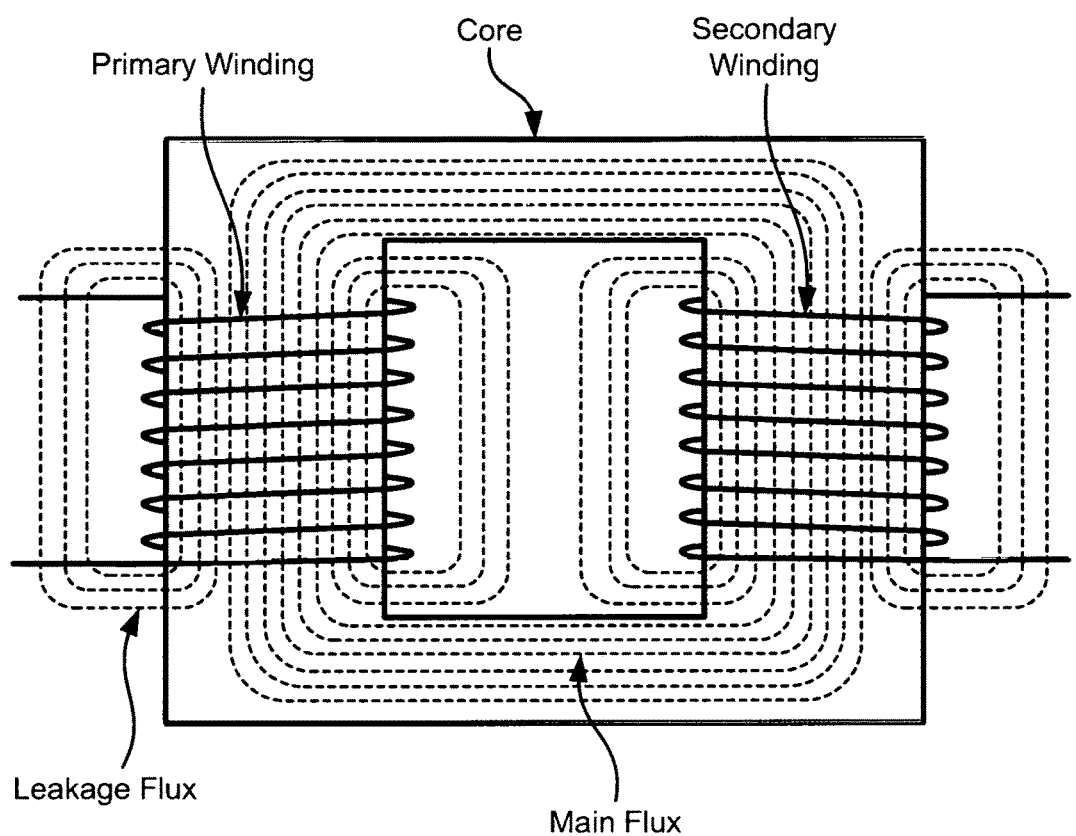
FIG. 1 (Prior Art) Illustrating how a transformer can have flux leakage.
Figure 2:
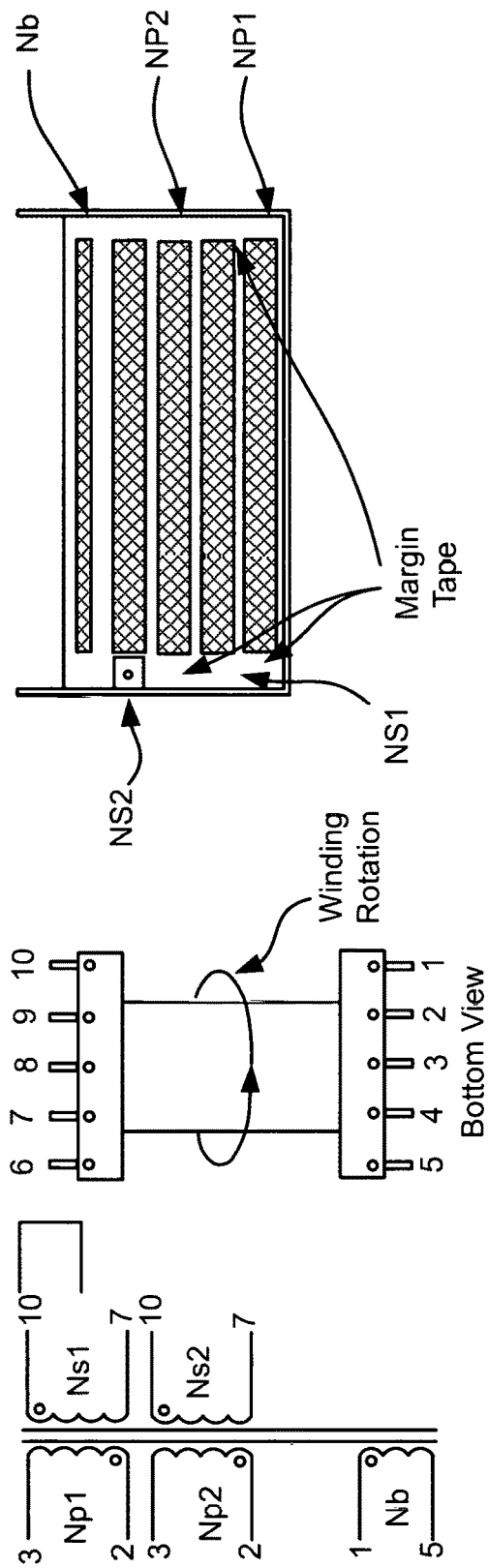
FIG. 2 (Prior Art) Illustration of a conventional flyback transformer with primary and secondary windings alternating to minimize flux leakage.

The following callout list of elements can be a useful guide in referencing the call out numbers of the drawings.

338 prior art bridge rectifier
345 prior art positive power rail
346 prior art negative power rail
339 prior art FET
340 prior art first diode
341 prior art primary winding
348 prior art capacitor
349 prior art resistor
343 prior art winding
335 prior art second diode
336 prior art buck converter
337 prior art LED load
342 prior art feedback winding
348 prior art negative rail (repeated number)
331 prior art third diode
332 prior art fourth diode
344 prior art auxiliary output winding
333 prior art rectifier diode
334 prior art smoothing capacitor
347 prior art ground wire
438 bridge rectifier
445 positive power rail
446 negative power rail
439 FET
440 first diode
441 primary winding
448 capacitor
449 resistor
443 winding
435 second diode
436 buck converter
437 LED load
442 feedback winding
431 third diode
432 fourth diode
444 auxiliary output winding
433 rectifier diode
434 smoothing capacitor
447 ground wire

DETAILED DESCRIPTION

Glossary

Figure 3:
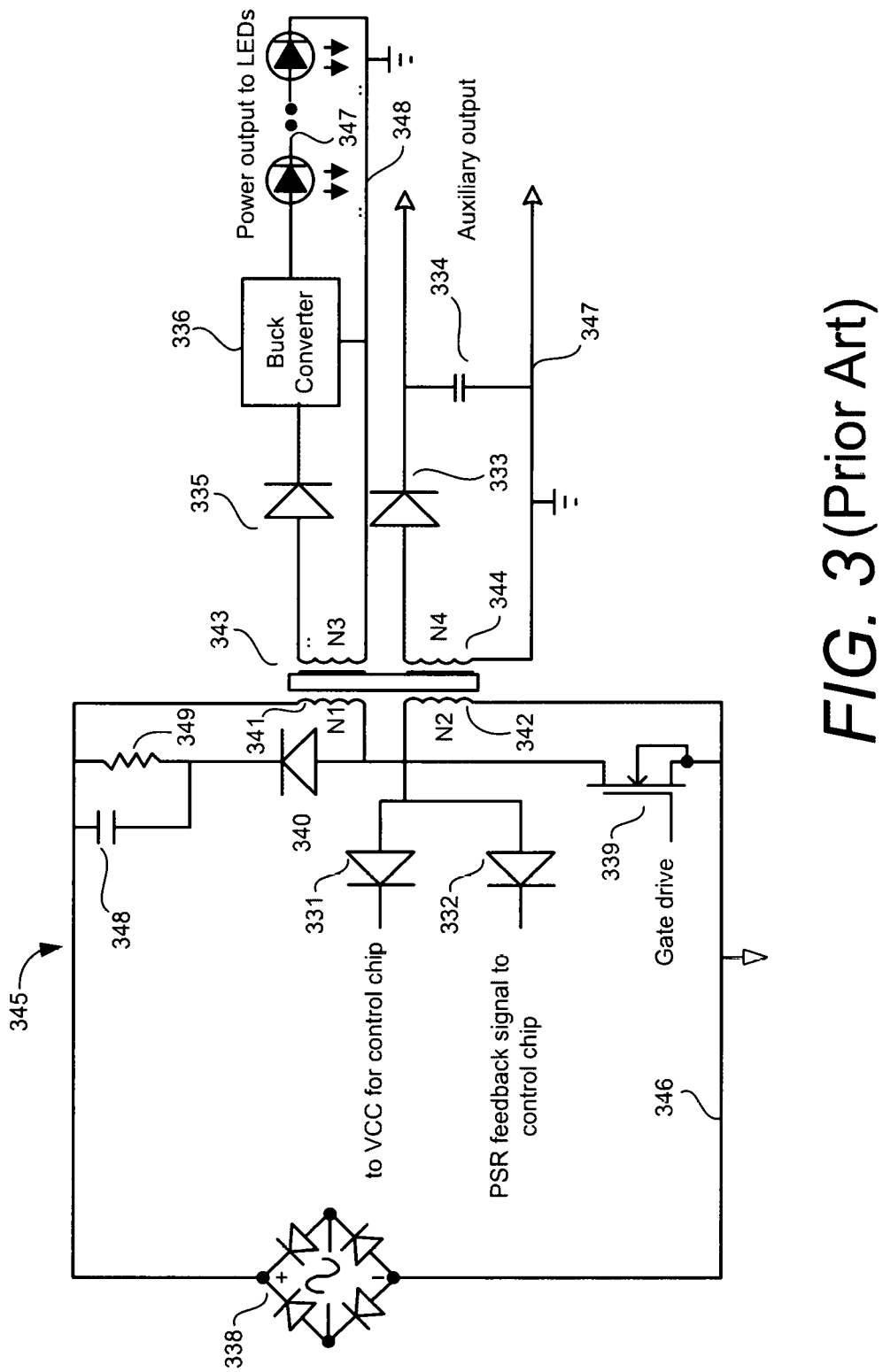
FIG. 3 (Prior Art) Schematically illustrates the principal elements of a primary side regulation flyback LED driver.
Figure 4:
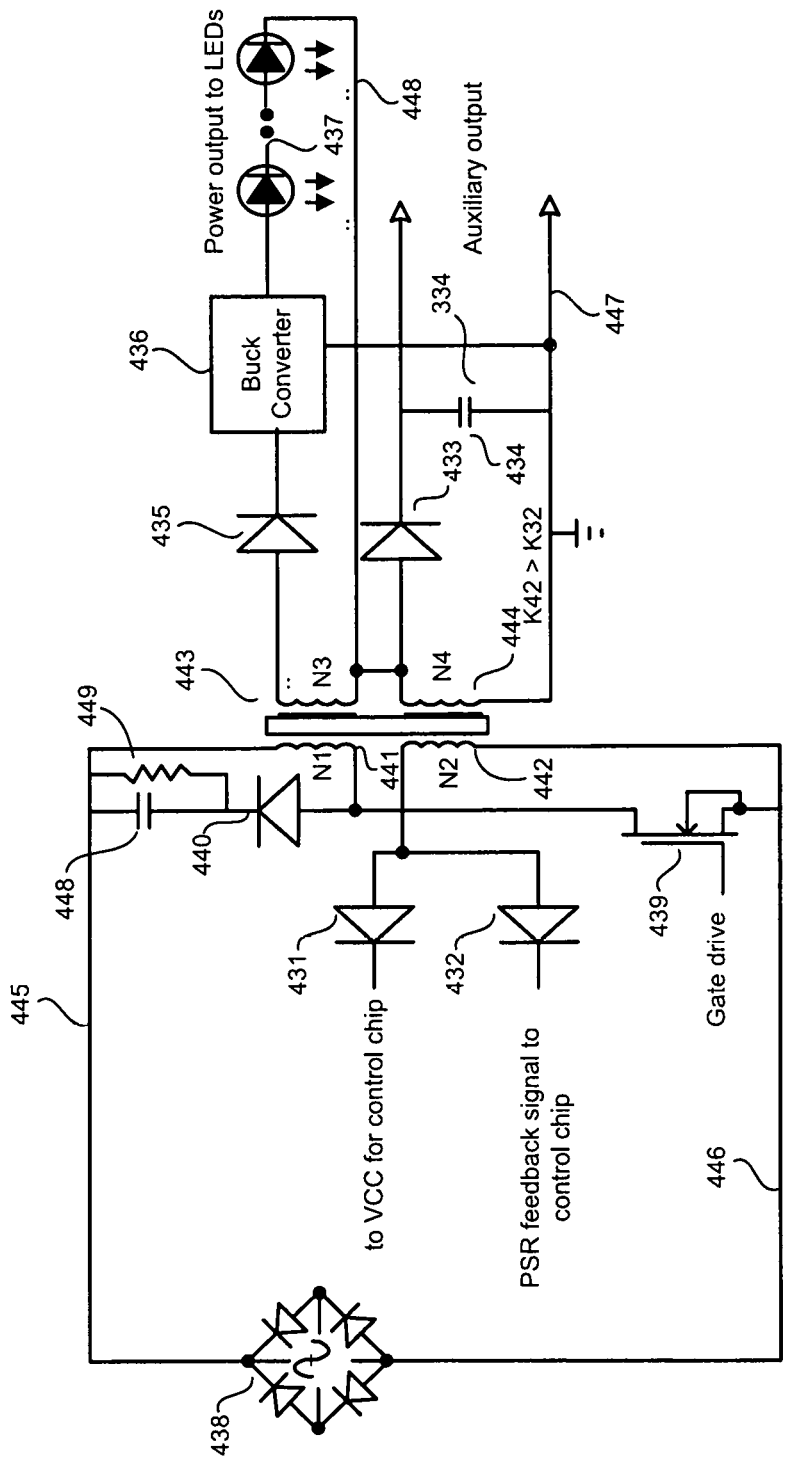
FIG. 4 Schematically illustrates the principal elements of a primary side regulation flyback LED driver incorporating a preferred embodiment of the invention.

PWM=pulse width modulation
Mps=mutual inductance between primary and secondary windings
PSR=primary side regulated
AC=alternating current
FET=field effect transistor
LED=light emitting diode
VCC=voltage common power supply
THD=total harmonic distortion
EE transformer=transformer using cores shaped like the letter E
EI transformers=transformer using one E shaped core (E core) and one straight line core (I core)
JFET=junction gate field-effect transistor
IGBT=insulated-gate bipolar transistor
AC/DC power converter=alternating current to direct current power converter The operation of the preferred embodiment is shown in FIG. 4, which relates to prior art FIG. 3 in that corresponding parts have a call out number which begins with the digit 4 instead of the digit 3. In most respects this circuit resembles a conventional primary side regulated (PSR) flyback, but with critical differences which will be explained below. The AC power is connected to the bridge rectifier 438, and produces a positive power rail 445 and a negative power rail 446. Primary winding 441 is connected from the positive rail to the negative rail by flyback FET 439. The gate drive of FET 439 is controlled by a suitable control chip, not shown. First diode 440 together with capacitor 448 and resistor 449 serve to dissipate energy from leakage inductance associated with primary winding 441. Winding 443 is the main output winding of the flyback converter, and it is connected by second diode 435 to a buck converter 436 which drives the LED load 437 with constant voltage or constant current as desired.

Winding 442 is connected to the negative rail 446 at one end and the other end is connected to third diode 431 and fourth diode 432 which take VCC power and a PSR feedback signal respectively to the control chip. The auxiliary output winding 444 has a rectifier diode 433 and a smoothing capacitor 434 which serve to provide regulated power to associated circuitry such as dimming controls or wireless transceivers, typically at 12V or 24V. The feedback winding 442 has a coupling coefficient K42 to auxiliary output winding 444, the auxiliary output winding, which is greater than the coupling coefficient K32 between the main output winding and feedback winding 442. When the circuit is operating delivering power to the LEDs and the auxiliary load, the auxiliary load may increase and because auxiliary output winding 444 is closely coupled to the feedback winding 442 the control chip will adjust the pulse width modulation operation of FET 439 so that the auxiliary output voltage remains much the same and good THD and power factor are preserved at the input. The output voltage of main winding 443 will increase as the converter delivers more power to the auxiliary output. The magnitude of this effect is minimized by having winding 443 connected in series with winding 444. Thus the increase in voltage across winding 443 is partially mitigated by the corresponding decrease in voltage across winding 444. The buck converter which finally drives the LEDs has its reference connected to the ground wire 447 of the auxiliary output and this can serve to keep the LED output power constant. Thus both the THD, the power factor and the output to the LEDs all remain unaffected when the auxiliary power load varies. For constant voltage applications the buck converter may be omitted and the LEDs connected directly from diode 435 with suitable smoothing capacitors.

Although the embodiment described was illustrated by a specific transformer design, it is to be understood that the same principles may be applied to any transformer design, including but not limited to cylindrical core or "slug" transformers, toroidal transformers, so called EI transformers, so called EE transformers, planar transformers and all other kinds of transformers known to those skilled in the art. Although a field effect transistor was described in the figures, it should be understood that any kind of solid state switch could be used, including but not limited to bipolar transistors, JFET transistors, IGBT devices and devices made from silicon, germanium, gallium arsenide or any other semiconductor material that can be used to fabricate a power switch. Although a secondary buck converter was used as an illustrative embodiment, it should be understood that this function could also be executed by a boost converter, a buck/boost converter or any of the multitude of power converters described in text books upon power converters. Although the invention was illustrated by a flyback converter with primary side control, it should be understood that the same principles could be applied to any of the commonplace species of regulated AC/DC power converters which use a transformer.

Throughout the entirety of the present disclosure, use of the articles "a" and/or an and/or the to modify a noun may be understood to be used for convenience and to include one, or more than one, of the modified noun, unless otherwise specifically stated. The terms "comprising", "including" and "having" are intended to be inclusive and mean that there may be additional elements other than the listed elements. Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein. Although the methods and systems have been described relative to a specific embodiment thereof, they are not so limited. Modifications and variations may become apparent in light of the above teachings. Additional changes in the details, materials, and arrangement of parts, herein described and illustrated, may be made by those skilled in the art.

The invention claimed is:

1. An LED driver using primary side regulation, having at least one input connected to the AC power line, and at least two outputs, including at least one for driving LEDs and at least one for providing auxiliary power for associated circuits; wherein said LED driver is constructed using a flyback principle, having at least one flyback transformer which has at least one primary winding connected to a flyback switching transistor, at least one principal output winding connected to an LED load, at least one feedback winding connected to a control chip and at least one auxiliary winding which drives said auxiliary power output; said auxiliary winding being characterized by having a coupling coefficient to said feedback winding which is greater than a coupling coefficient between said at least one principal output winding and said at least one feedback winding.

2. The LED driver of claim 1 in which the auxiliary power output is at either 12V or 24V.

3. The LED driver of claim 1 in which the principal output winding is connected to the LED load through a buck converter.

4. The LED driver of claim 1 in which the power drawn from the auxiliary output is configured to vary from zero to 1 A while the input THD (total harmonic distortion) remains less than 20%.

5. The LED driver of claim 1 in which while driving anything up to the full rated LED output current, the input THD (total harmonic distortion) remains under 20% while the current drawn from the auxiliary output is configured to vary from zero to 200 mA.

6. The LED driver of claim 1 in which while driving anything up to the full rated LED output current, the input THD (total harmonic distortion) remains under 20% while the current drawn from the auxiliary output is configured to vary from zero to 375 mA.

7. The LED driver of claim 1 in which the auxiliary winding is connected in series with the principal output winding.

8. The LED driver of claim 7 in which the auxiliary power output is at either 12V or 24V.

9. The LED driver of claim 7 in which the principal output winding is connected to the LED load through a buck converter.

10. The LED driver of claim 7 in which the power drawn from the auxiliary output is configured to vary from zero to 1 A while the input THD (total harmonic distortion) remains less than 20%.

11. The LED driver of claim 7 in which while driving anything up to the full rated LED output current, the input THD remains under 20% while the current drawn from the auxiliary output is configured to vary from zero to 200 mA.

12. The LED driver of claim 7 in which while driving anything up to the full rated LED output current, the input THD remains under 20% while the current drawn from the auxiliary output may vary from zero to 375 mA.

13. A dimmable PSR (primary side regulated) flyback LED driver with an auxiliary output for powering associated circuitry characterized by having a coupling coefficient between a flyback transformer winding driving the auxiliary output and a flyback winding providing feedback to a control chip higher than a coupling coefficient between a main LED drive output winding and the flyback winding providing feedback to the control chip.

14. The dimmable PSR flyback LED driver of claim 13 in which the main output winding of the flyback transformer is connected in series with the flyback winding providing auxiliary output current for use by associated circuits and equipment.

* * * * *